United States Patent
Barrow et al.

(10) Patent No.: US 7,519,690 B1
(45) Date of Patent: Apr. 14, 2009

(54) DYNAMICALLY UPDATEABLE PARAMETERS IN INTEGRATED SERVICES HUB

(75) Inventors: Matthew Barrow, Overland Park, KS (US); Thomas Bayerl, Williamston, MI (US); Steven R. Lilly, East Lansing, MI (US)

(73) Assignee: Sprint Communications Company L.P., Overland Park, KS (US)

( * ) Notice: Subject to any disclaimer, the term of this patent is extended or adjusted under 35 U.S.C. 154(b) by 1337 days.

(21) Appl. No.: 10/086,099

(22) Filed: Feb. 28, 2002

(51) Int. Cl.
*G06F 15/177* (2006.01)
(52) U.S. Cl. ...................... 709/220; 709/228
(58) Field of Classification Search ............. 709/221, 709/222, 220, 228, 229, 250
See application file for complete search history.

(56) References Cited

U.S. PATENT DOCUMENTS

| | | | |
|---|---|---|---|
| 5,881,142 A | 3/1999 | Frankel et al. | 379/167 |
| 5,963,620 A | 10/1999 | Frankel et al. | 379/93.05 |
| 6,009,274 A * | 12/1999 | Fletcher et al. | 717/173 |
| 6,012,100 A * | 1/2000 | Frailong et al. | 709/250 |
| 6,029,196 A * | 2/2000 | Lenz | 709/221 |
| 6,070,246 A * | 5/2000 | Beser | 726/2 |
| 6,075,784 A | 6/2000 | Frankel et al. | 370/356 |
| 6,098,098 A * | 8/2000 | Sandahl et al. | 709/221 |
| 6,118,768 A * | 9/2000 | Bhatia et al. | 370/254 |
| 6,141,339 A * | 10/2000 | Kaplan et al. | 370/395.61 |
| 6,286,038 B1 * | 9/2001 | Reichmeyer et al. | 709/220 |
| 6,560,699 B1 * | 5/2003 | Konkle | 713/1 |
| 6,587,874 B1 * | 7/2003 | Golla et al. | 709/220 |
| 6,754,885 B1 * | 6/2004 | Dardinski et al. | 717/113 |

OTHER PUBLICATIONS

U.S. Appl. No. 09/197,044, filed Nov. 20, 1998, Way et al.
U.S. Appl. No. 09/226,575, filed Jan. 7, 1999, Rush et al.
U.S. Appl. No. 09/650,985, filed Aug. 30, 2000, Kaplan et al.
U.S. Appl. No. 09/650,560, filed Aug. 30, 2000, Kaplan et al.
U.S. Appl. No. 09/653,105, filed Aug. 31, 2000, Dale et al.
U.S. Appl. No. 09/675,585, filed Sep. 29, 2000, Goodrich.
U.S. Appl. No. 09/687,683, filed Oct. 12, 2000, Bayerl et al.
U.S. Appl. No. 09/689,365, filed Oct. 12, 2000, Goodrich.
U.S. Appl. No. 09/702,933, filed Oct. 31, 2000, Mahaney.
U.S. Appl. No. 09/711,113, filed Nov. 9, 2000, Goodrich et al.
U.S. Appl. No. 09/727,201, filed Nov. 30, 2000, Mahaney et al.

(Continued)

*Primary Examiner*—Ario Etienne
*Assistant Examiner*—El Hadji M Sall

(57) ABSTRACT

The present invention discloses a method of dynamically updating configuration files in a customer premises telecommunications hub. The hub includes a configuration file update module. During initialization, every system module which uses parameters in the configuration file registers with the update module. While the hub is operating, a new configuration file is sent to the IP address of the hub and written into flash memory by the update module. The update module calls a check function in the registered modules which check to see if the new parameters can be changed dynamically. If they can, the update module calls an update function in all registered modules which then change their parameters to those set by the new configuration file. If any module needs a parameter change which cannot be made dynamically, the update module calls for a system reset or reboot.

14 Claims, 3 Drawing Sheets

OTHER PUBLICATIONS

U.S. Appl. No. 09/745,919, filed Dec. 21, 2000, Bayerl et al.
U.S. Appl. No. 09/745,000, filed Dec. 21, 2000, Bayerl et al.
U.S. Appl. No. 09/747,907, filed Dec. 22, 2000, Barrow.
U.S. Appl. No. 09/751,778, filed Dec. 29, 2000, Lawitzke.
U.S. Appl. No. 09/998,419, filed Nov. 29, 2001, Barrow.

* cited by examiner

DYNAMICALLY UPDATEABLE PARAMETERS IN INTEGRATED SERVICES HUB

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to a method for updating parameters in a customer premises telecommunications hub, and more particularly to a method for dynamically updating configuration files.

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexers. Each local loop carries ATM over ADSL (asymmetric digital subscriber line) traffic to and from a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described In co-pending U.S. Pat. No. 6,272,553 entitled "Multi-Services Communications Device," issued on Aug. 7, 2001, which is incorporated by reference herein in its entirety. The network interface typically is a broadband network interface such as ADSL, T1, or HDSL-2. Examples of user interfaces include telephone interfaces such as plain old telephone system (POTS) ports for connecting telephones, fax machines, modems, and the like to the ISH; computer interfaces such as Ethernet ports for connecting computers and local area networks to the ISH; and video ports such as RCA jacks for connecting video players, recorders, monitors, and the like to the ISH.

In providing telephony services over a broadband network, the ISH communicates with a service manager. This connection between the telephone and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detect off-hook conditions, on-hook connections, and digits as well as provide the telephones with dial tone, ring voltage (sometimes referred to as ring current), ringback, and busy signals. The terms off-hook and off-hook condition as used herein are generic terms meaning that a user device (whether telephone, facsimile machine, modem, etc.) connected to a telephone line is attempting to access and use the line.

The ISH includes a processing core or central processing unit, CPU, which controls these functions. It must exchange data with numerous peripheral devices within and external to the ISH itself. As with any other CPU, it must have appropriate software in order to perform the many required functions. As the controller for the ISH, it requires configuration files to set parameters for the various interfaces for the POTS ports, Ethernet ports, etc. However, the necessary configuration and binary files are not known until the ISH is installed in a customer premises, such as a private residence. It is not practical to expect or require individual customers to know how to configure the ISH after it is physically installed. It would be quite expensive to have a trained service technician visit each residence for initializing the system, i.e. loading the necessary software. There is a need for a method for automatically initializing an ISH when it is installed and powered up for the first time. There is also a need to quickly and efficiently update parameters in the configuration file from time to time.

BRIEF SUMMARY OF THE INVENTION

The present invention provides a method for operating an integrated services hub so that system parameters may be updated dynamically, i.e. without rebooting the system. The system includes a configuration update module for receiving new configuration files. Upon system initialization, each module in the system registers with the update module and provides it with its check and update function calls. When a new configuration file is received by the update module, it stores the new configuration file and issues a check function call to each of the other modules. Each module checks the new configuration file against its current parameters, determines if any changes require it to reboot, and notifies the update module if reboot is needed. If any module requires a reboot, the update module issues a reboot command and the system reboots. If no reboot is needed, the update module issues an update function call to all modules, which then update their parameters to the new configuration file setting dynamically, i.e. without a reboot.

DETAILED DESCRIPTION OF THE INVENTION

Figure 1:
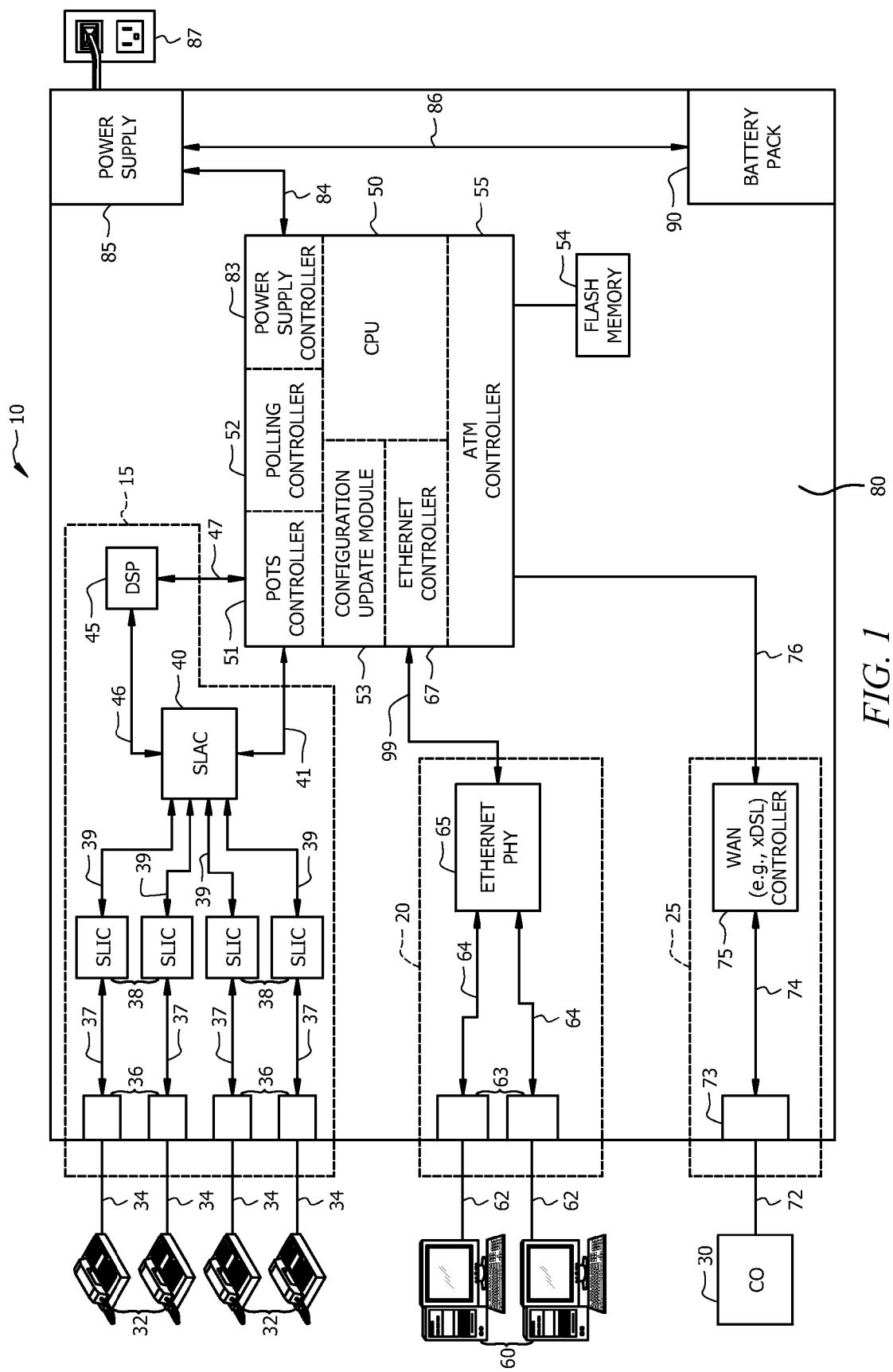
FIG. 1 is a block diagram of an integrated services hub, ISH, according to the present invention; and, FIG. 2 is a flow chart illustrating the automatic downloading of configuration and binary files.

Referring to FIG. 1, integrated services hub (ISH) 10 comprises plain old telephone system (POTS) interface 15, local area network (LAN) interface 20, and wide area network (WAN) interface 25. POTS interface 15 and LAN interface 20 provide user interfaces for the ISH. WAN interface 25 provides the ISH with an interface to a central office, CO, 30 having a broadband packet network such as Sprint's ION network. The CO 30 provides the wide area connection to a Wide Area Network (WAN), e.g. the Internet. In describing the ISH, the components are generally described in carrying out the appropriate function to transmit data from the user interfaces to the WAN, and it should be understood that these components, in general, perform the reverse function when receiving data from the WAN and transmitting it to the user interfaces.

Telephones 32 are connected by telephone lines 34 to POTS interface 15 by telephone jacks 36, for example industry standard RJ-11 jacks. While four telephones are shown in FIG. 1, any desirable number of telephones may be employed provided that the equipment is appropriately sized to accommodate that number. Telephones 32 are conventional communications devices that typically use the analog telephony format, and similar devices may be substituted such as facsimile machines or modems. Digital format telephones could also be used, with the understanding that the specific circuitry involved would change while providing equivalent functions (for example, detecting hook transitions). Telephone lines 34 are any medium operational to carry telephony signals, and are typically twisted pairs of copper wires.

In addition to telephone jacks 36, POTS interface 15 further comprises subscriber line interface circuits (SLICs) 38, subscriber line access circuit (SLAC) 40, and digital signal processor (DSP) 45. SLICs 38 are connected to telephone jacks 36 by connections 37 on a one-to-one basis. In other words, each telephone connected to the ISH by a telephone jack has a separate and corresponding SLIC. Alternatively, SLICs may incorporate more than one channel each, that is to say a SLIC may be connected to more than one telephone line. The SLICs convert relatively high power, two-line analog signals (also referred to as a tip and ring phone circuit) received from the telephone into relatively low power, four-line analog signals (also referred to as a transmit signal circuit and a receive signal circuit). Furthermore, the SLIC serves as the amplifier that drives power (i.e., voltage and current) onto its corresponding telephone line. Examples of suitable SLICs are integrated circuit chip numbers AM79R79 and AM79R241 produced by Legerity, the former communications division of Advanced Micro Devices (AMD), Inc.

SLAC 40 is connected to SLICs 38 by connections 39. Generally, a SLAC performs three functions: line supervision, signal filtering and manipulation, and analog/digital conversions. The SLAC supervises the lines (and the SLIC corresponding to each line), which includes execution of various protocols for detecting and recognizing an off-hook condition. While a preferred embodiment shown in FIG. 1 uses a SLAC to perform line supervision, SLICs are available that perform line supervision functions, and such enhanced SLICs having integral hook transition monitoring capability could be used. Signal filtering and manipulation is used to conform signals to various industrial or regional/national telephony standards. The SLAC converts four-line analog signals received from the SLICs into four-line digital signals. Thus, the SLAC is an analog to digital (A/D) and digital to analog (D/A) converter, which is also referred to respectively as coding and decoding (i.e., a CODEC). Preferably, the SLAC codes and decodes in compliance with the International Telecommunications Union (ITU) G.711 standard. Typically, a SLAC manages a fixed number of SLICs, and thus the number of SLACs is determined by the number of SLICs. Examples of suitable SLACs are integrated circuit chip numbers AM79Q021 and AM79Q2243 produced by Advanced Micro Devices (AMD), Inc., which are a quad-devices designed to manage four SLICs.

SLAC 40 transmits and receives control data such as line status and signaling to the central processing unit (CPU) 50 by connection 41. The CPU 50 controls the overall function of the ISH and has initialization, management, configuration, and control responsibilities for all of the components and interfaces comprising the ISH. Control software, i.e. the binary code, is stored in flash memory 54. Upon start up or reset of the ISH, the CPU 50 loads the control software into RAM from which it is executed by the CPU 50. Upon execution of the control software, the CPU 50 interacts with various memory mapped peripherals (for example, WAN interface 25). The CPU 50 control software includes: a) a POTS control module 51 that controls the telephony functions during operation of the ISH under primary power; b) a polling control module 52 that controls the POTS telephony functions when primary power fails; c) a configuration update module 53 which manages updating of configuration parameters; d) a power supply control module 83 which monitors, either continuously or periodically, the power supply; e) an Ethernet control module 67; and f) ATM control module 55 that controls the communications with the network. An example of a suitable CPU is integrated circuit chip number MPC8260 Power QUICC II Communications Processor produced by Motorola, Inc.

Digital signal processor (DSP) 45 compresses (i.e., packetizes) data, typically voice data, received from SLAC 40 by connection 46. DSP 45 transmits compressed data to CPU 50 via connection 47 for transmission to CO 30 by ATM control module 55. An example of a suitable DSP is integrated circuit chip number TMS320VC5402 produced by Texas Instruments, Inc. ATM control module 55 provides the ATM and ML (ATM adaptation layer) layers of the ATM Protocol, which are necessary for ATM-formatted communications with CO 30. In a preferred embodiment, ATM control module 55 is a software module on CPU 50.

Computers 60, for example personal computers located on a residential premises, are connected by connections 62 to LAN interface 20 by LAN connectors 63. LAN connectors 63 are preferably RJ-45 jacks, but any suitable computer connection means may be employed, for example a universal serial bus (USB). While two computers are shown in FIG. 1, any desirable number of computers may be employed provided that the equipment is appropriately sized to accommodate that number.

LAN interface 20 further comprises a LAN physical layer (PHY) device 65 connected to LAN connectors 63 by connections 64. LAN PHY device 65 is preferably an Ethernet PHY, and more specifically a MII transceiver. CPU 50 contains an Ethernet control module 67, which serves as a media access control (MAC) device and is connected to LAN PHY device 65 by connection 66. The Ethernet PHY and MAC devices support a 10/100 Mbit industry standard MII Ethernet connection.

The CO 30 is connected by connection 72 to WAN interface 25 by WAN connector 73. WAN connector 73 is preferably a RJ-11 jack for ADSL. WAN interface 25 is preferably a universal, xDSL interface, and more preferably an ATM over ADSL interface. xDSL is a generic term encompassing all known varieties of digital subscriber lines (DSL) such as ADSL, U-ADSL, SDSL, HDSL2, RADSL, etc. Other types of WAN interfaces could be used such as T1, cable modem, wireless broadband modem, or ATM-25.

WAN interface 25 further comprises WAN controller 75 connected to WAN connector 73 by connection 74. WAN controller 75 is connected to ATM control module 55 by connection 76. WAN controller 75 is preferably Globespan's G7000 multimode chip set, which further comprises an analog front end (AFE) chip (Globespan GS707X) and a multimode XDSL downloadable DSP and framer chip (Globespan GS707X). The AFE chip provides analog to digital and digital to analog signal conversions. The DSP and framer chip provides digital signal processing and signal transmission framing functions.

POTS interface 15, LAN interface 20, WAN interface 25, CPU 50, and ATM controller 55 are mounted on motherboard 80, which is a printed circuit board (also referred to as a logic board) that provides the various connections between ISH components as discussed above. The motherboard may include expansion slots to accept expansion cards such as an additional POTS card, an ATM-25 interface, a cable modem, etc. Motherboard 80 is connected to power supply 85 and battery pack 90, thereby providing power to the ISH components, the attached analog telephones, and the battery monitoring and charge circuitry. CPU 50 contains a power supply control module 83 connected to power supply 85 by connection 84. A preferred power supply is a universal-input (40-400 Hz, 90-270V AC RMS) switch mode lead/acid battery float charger with a current-limited output of nominally 13.8 V, and provides charging current to battery pack 90 as represented by connection 86. A preferred battery is a 12 volt DC, 2.5 A gel cell (lead-acid) battery, and preferably battery pack 90 comprises two such batteries housed within the ISH.

The power supply is plugged into a standard electrical outlet 87 and serves as the primary power source for the ISH. In the event of a power failure to the electrical outlet, the ISH operates under backup power provided by its battery pack and basic telephone services remain available to the customer for emergency calls.

Each of the controllers illustrated as being part of the CPU 50 are actually software stored as binary code in flash memory 54. At the time of manufacture of the ISH, its final installation location and configuration are not known and therefore the required configuration files and binary code cannot be known. Instead, the ISH is manufactured with code to perform an automatic downloading of configuration files and binary code according to the steps illustrated in FIG. 2.

Figure 2:
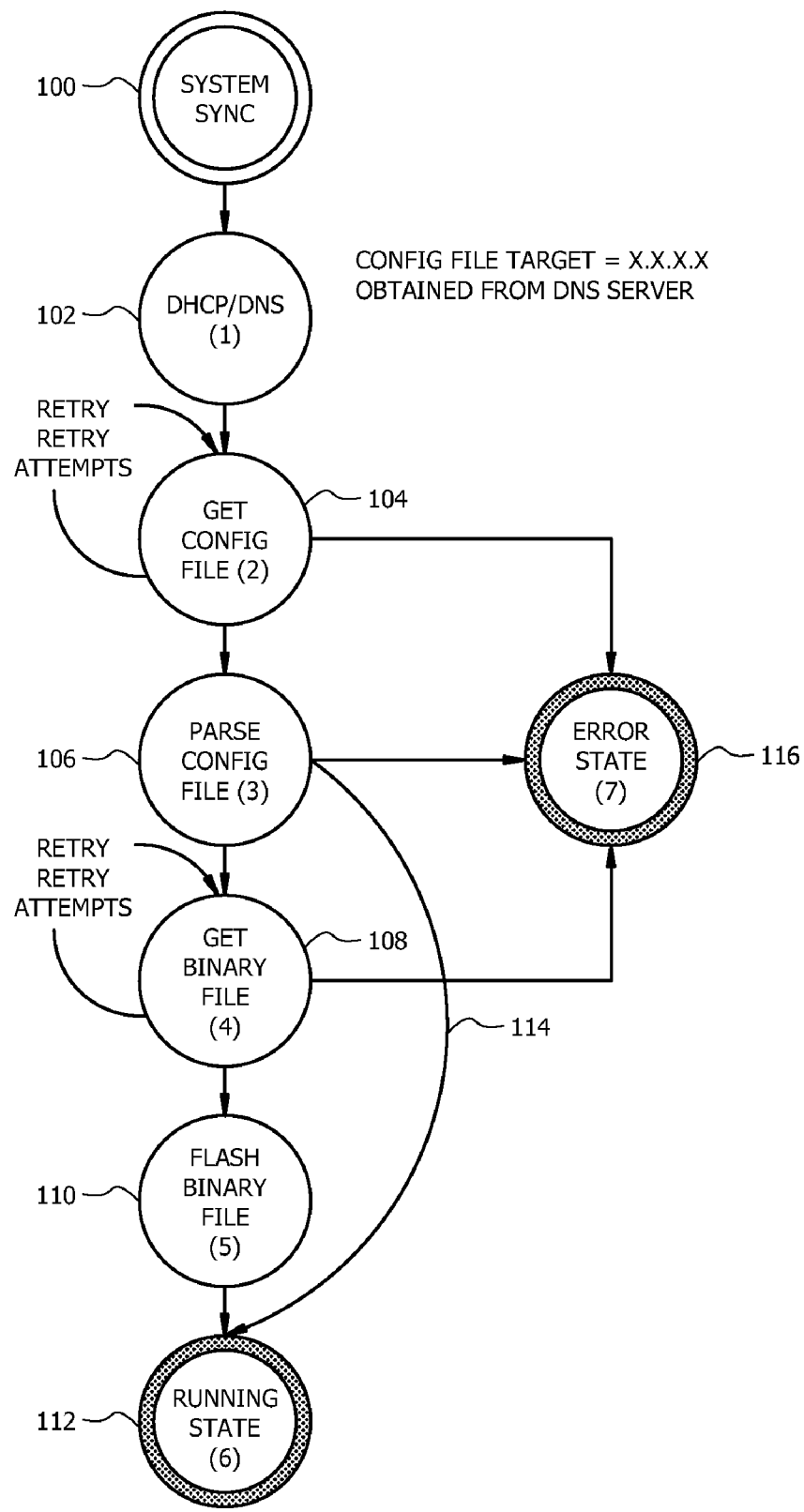

At step 100 shown in FIG. 2, the system sync, also referred to as reboot or reset, function is triggered by the start up of the system. Start up means that the system is installed and has power turned on. Start up occurs upon initial installation of the system, but also occurs each time that power to the system is turned off, e.g. when power at outlet 87 is lost for sufficient time to deplete the backup power supply battery pack 90. Rebooting may also occur in response to manual pressing of a reset button or in response to a command received from the WAN or from the configuration update module 53.

In step 102, the system issues a DHCP, dynamic host control protocol, request to the CO 30. In response to this request, the CO DHCP server provides the ISH with a unique IP address to identify the ISH itself. The DHCP server also supplies the name of the appropriate configuration file, the domain name of configuration file servers where configuration and binary files are stored and a list of IP addresses for domain name servers, DNSs, which can provide IP addresses for the configuration file servers. In the preferred embodiment, the configuration file servers are standard TFTP, trivial file transfer protocol, servers. These servers may be located in CO 30 or at any other location accessible over a WAN, such as the Internet.

Since the ISH now has its own IP address, it can theoretically send data packets to, and receive data packets from, any other site on the Internet. For security purposes, the ION system restricts such communications to systems such as those described herein. In Step 102, the ISH 10 also uses one of the DNS addresses to send a message to a domain name server to obtain the IP addresses of configuration file servers corresponding to the domain name it received from the DHCP server.

In step 104, the ISH uses one of the IP addresses to request the configuration file from a configuration file server. If a response is not promptly received, the ISH automatically cycles through the list of IP addresses until it finds a server which provides the configuration file.

In step 106, the ISH receives and parses the configuration file. The configuration file contains the name of the appropriate binary file. At the time of manufacture, a basic binary file is loaded into flash memory 54, since otherwise the system cannot start up. But the basic binary file is not suitable for actually running the ISH after it is installed. As part of the parsing process, the ISH checks the binary file name in the configuration file against the name in the flash memory 54. On initial start up, it will not match.

In step 108, the ISH sends another message to a configuration file server requesting the binary file called for in the configuration file. The binary file may be obtained from any of the configuration file servers which correspond to the same domain name, i.e. it does not have to be the same one from which the configuration file was obtained. If a response is not promptly received, the ISH automatically cycles through the list of IP addresses until it finds a server which provides the binary file.

When the new binary file is received, it is stored in flash memory in step 110. In the preferred embodiment, flash memory 54 has spaces allocated to store two binary file images. At the time the ISH is manufactured, the basic file is stored in the first space. When the new binary file is received, it is stored in the second. If the binary file is later replaced with an improved version, it will be written over the first space. Later improved versions are written in space two, then space one, and so on. This process avoids loss of all valid binary files in the event of power loss or other interruption or error during the process of writing a new binary file to flash memory.

When the ISH started up in step 100, it used the original binary file stored in flash memory 54. The CPU read that binary file from the flash memory 54 and stored it in RAM for use in actual operation of CPU 50. It operates with that version while the new binary image is transferred and written into flash memory 54. So, when step 110 is completed, the ISH flags the newly stored binary file as the current binary file and issues a reset, or reboot, command. When the CPU 50 resets at step 100, it loads the new binary file from flash memory 54 into RAM. At step 104 the ISH obtains the configuration file again. When the ISH parses the configuration file at step 106, it will find that the name of the binary file in the configuration file now matches the name of the binary file which it is running. It will then transition directly to the running state at step 112, as indicated by the path 114. Once in the running state, the ISH can operate properly until power loss or some error or an intentional reset command causes the system to reset. The configuration file which was downloaded provides the parameters needed by the CPU 50 to properly operate the various components and interfaces of the ISH described above.

The above description assumes that each step of the process works as intended on the first try. The ISH supervisor provides some additional steps when the process does not work smoothly. One is an overall timeout for the startup process. If the ISH does not reach the running state 112 or an error state 116 within the set time, the ISH will reset and start the process over. In each of steps 104 and 108, there are provided timeouts which cause the ISH to repeat the step if the requested file is not received within the preselected time. There is also a limit on the number of retry attempts which can be made before the system tries another domain name server or configuration file server. At step 102, the DHCP response provided a list of IP addresses for domain name servers and a list of domain names for configuration file servers. In step 104, if the ISH cannot contact the first domain name server in the set number of retry attempts, it tries the second address, then the third, etc. It will cycle through the list until it succeeds in obtaining a list of IP addresses for the domain name servers. In steps 104 and 108, if the ISH cannot contact the first IP address of a domain name server in the set number of retry attempts, it tries the second, then the third, etc. It will cycle through the list until it succeeds in obtaining the configuration file in step 104 or the binary file in step 108. If the parsing operation in step 106 fails, the system also goes to the error state. Upon entering the error state 116, the system resets and starts the process over.

As noted above, the configuration file downloaded in the system initialization process provides operating parameters for the various system modules, e.g. POTS module 51 and Ethernet module 67. For various reasons, these parameters may need to be changed or updated. For example, the level of comfort noise or the flash hook delay time for POTS module 51 may need to be adjusted. The operating speed of Ethernet module 67 may need to be changed, e.g. from 10 Megabyte to 100 Megabyte rate. As is apparent from the above described initialization process, the configuration file can be changed by initiating a full reset or reboot of the ISH. This can be done by manually pushing a reset button or removing power from the ISH and then reapplying power. However, these steps require action to be taken at the location of the ISH. It also requires a complete reboot of the system which interrupts operation of the system until the reboot is complete. In the present invention, configuration parameters are updated remotely and, if possible, dynamically, i.e. without rebooting the system.

Figure 3:
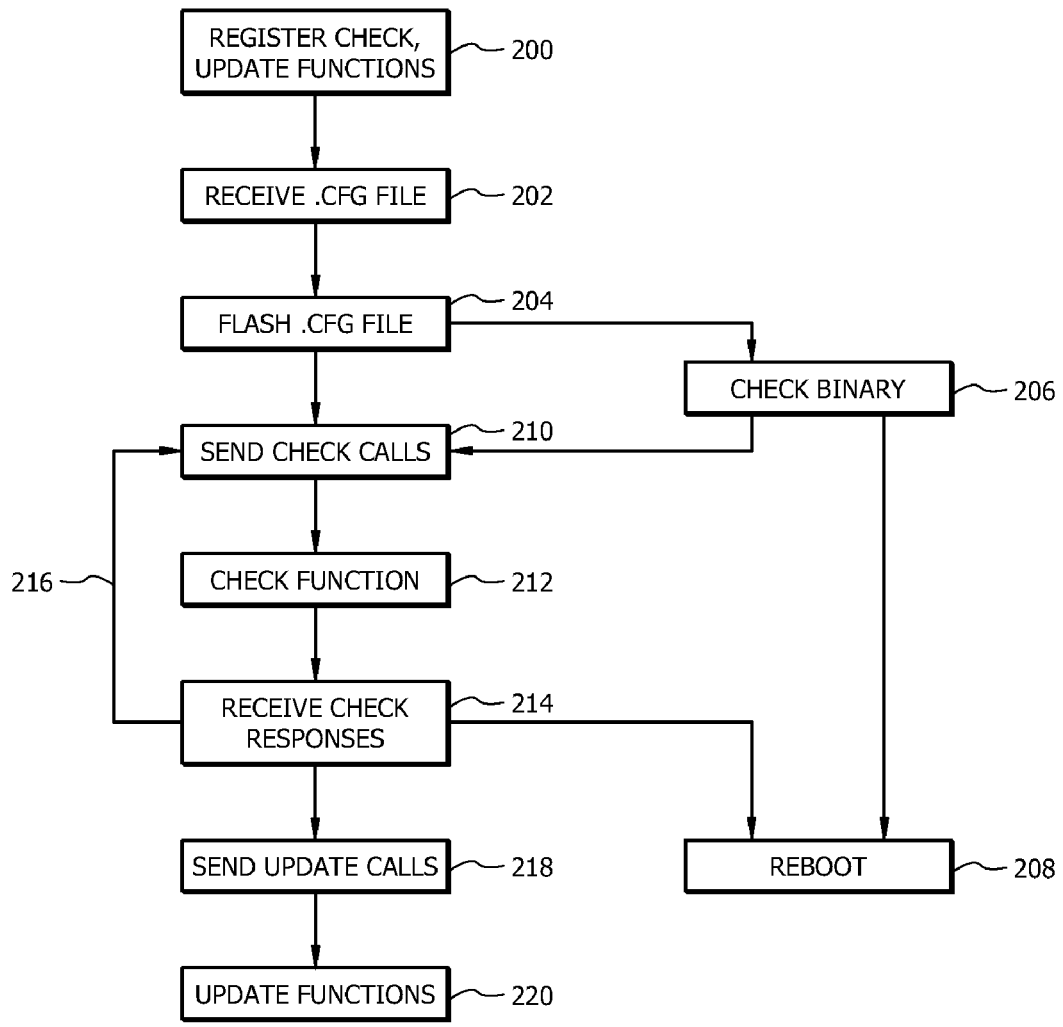
FIG. 3 is a flow chart illustrating the downloading of an updated configuration file and dynamic updating of system parameters.

With reference to FIG. 3, the dynamic parameter updating process of the present invention will be described. Each of the modules in controller 50 has a number of functions which it can perform and which can be initiated or called by other modules or systems. In the present invention, these functions include a "check" function and an "update" function, both of which are part of every module for which a parameter is provided in the configuration file. At step 200, as part of the initialization process, each module with check and update functionality registers these functions with the configuration update module 53. This registration allows the configuration update module 53 to update the parameters when a new configuration file is received. Each such module also reads the relevant parameters from the configuration file in flash memory and stores a copy to control its operations.

During the initialization process, the ISH first obtained an IP address from a DHCP server in CO 30. The server keeps a record of the IP addresses of all ISHs served by the CO 30. From time to time it is desirable to change or update the configuration files in one or more ISHs. The new files may be stored in the TFTP server, but it is necessary to download the new files to the ISHs. In the present invention a configuration file may be updated without a request from the ISH. A new, i.e. updated, configuration file may be sent from a TFTP server to the IP address of the ISH. At step 202 a new configuration file, identified by the suffix ".cfg" is received by the ISH 10 and routed to the configuration update module 53. At step 204 the update module 53 loads the new file into flash memory. At step 206, the configuration update module 53 checks to see if the binary file name in the new configuration file matches the name of the binary file currently running. If it does not, the update module 53 issues a reboot command at step 208 and the process of FIG. 2 will be repeated. If the binary file name is the same, i.e. no change in the binary file, then at step 210, the update module 53 sequentially calls the check function at each of the registered modules.

At step 212 each module which receives a check function call, e.g. POTS module 51, performs the check function. Each module starts by reading the new configuration file in flash memory, or at least by reading the parameters which affect it. Then each module compares the new parameters to the previously stored parameters to see if any changes have actually been made. Each parameter used in a module is designated as to whether or not it can be dynamically changed or requires a system reboot. Each module completes the check function process by reporting back to the update module 53 that it needs to reboot or does not need to reboot. A reboot is required if a parameter change is needed and it is one which requires reboot. A reboot is not needed if there is no parameter change or the change which is needed can be made dynamically, i.e. without a reboot.

At step 214, the update module sequentially receives the responses from each module as they perform the check functions. For each response which reports that no reboot is needed, another check call is sent to the next module as indicated by the feedback path 216. This loop continues until either every module has performed the check function or one reports that a reboot is needed. If any module reports that a reboot is needed, then the update module 53 issues a reboot or reset command 208 and the process of FIG. 2 is repeated.

If none of the modules reports that a reboot is needed, then, at step 218, update module 53 calls the update function at each of the registered modules. At step 220 each module performs the update function by reading the configuration parameters from flash memory 54 which affect it, storing a local copy of the new parameters and operating with the new parameters.

The update process described above is intended to allow dynamic reconfiguration. That is, it should occur without shutting down the system for rebooting and without interfering with current active functions. It is preferred that the update functions be deferred until the system is in idle state. Idle state occurs when there are no calls in progress, no off hook conditions, no data transfers in progress, etc. While comfort noise level can be dynamically changed without causing a system fault, a customer might be surprised if the change is made in the middle of a phone call. A change in IP address does not require a system reset, but would interfere with a file download in progress. Therefore it is preferred to perform the update functions only during idle state.

For similar reasons, it is preferred to delay a reboot until the system is in idle state. A full reboot cannot occur dynamically. Instead it causes an interruption in service, and terminates calls in progress or file downloads. The present invention avoids unnecessary reboots by not assuming that a configuration file update requires a reboot. Instead it provides a method for checking the effects of a new configuration file and performing a dynamic file update, if it is possible to do so.

While the present invention has been illustrated and described with reference to particular equipment and methods of operation, it is apparent that various changes and substitution of equivalent parts can be made within the scope of the present invention as defined by the appended claims.

What we claim as our invention is:

1. A method for updating configuration parameters in a customer premises telecommunications hub comprising:
   receiving in a customer premises telecommunications hub a new configuration file sent from a remote location;
   identifying, by said customer premises telecommunications hub, parameters in the new configuration file which are different than existing operating parameters stored in said customer premises telecommunications hub;
   determining, by said customer premises telecommunications hub, whether all of the parameters in the new configuration file which are different can be changed dynamically, and updating all of the existing operating parameters stored in said customer premises telecommunications hub to the parameters in the new configuration file which are different without rebooting said customer premises telecommunications hub when all of the parameters in the new configuration file which are different can be dynamically changed,
   wherein said customer premises telecommunications hub comprises a configuration update module and a plurality of other functional modules which use parameters contained in the new configuration file,
   wherein said other functional modules register check and update function calls with said update module,
   wherein said update module writes the new configuration file into flash memory and issues the check function call to each of the other functional modules,
   wherein each of the other functional modules performs the check function by comparing configuration file parameters in the new configuration file to its existing operating parameters, and notifying the update module whether the parameters which are different can be changed dynamically,
   wherein said update module issues the update function call to each of the other functional modules when the update module is notified by all of the other functional modules that the parameters which are different can be changed dynamically, and
   wherein each of the other functional modules performs the update function by reading the parameters which are different from the new configuration file and writing the read parameters to locally stored configuration file parameters which it uses.

2. The method according to claim 1, further comprising:
   updating all of the existing operating parameters stored in said customer premises telecommunications hub to the parameters in the new configuration file which are different by rebooting the customer premises telecommunications hub when any of the parameters in the new configuration file which are different cannot be dynamically changed.

3. The method according to claim 1, wherein:
   said step of updating parameters is performed when said customer premises telecommunications hub is in an idle state.

4. The method according to claim 1, wherein:
   said new configuration file is received over a wide area network connection in Internet protocol.

5. The method according to claim 1, wherein:
   said new configuration file is received over a DSL connection to a server in a central office.

6. A customer premises telecommunications hub, comprising:
   a wide area network connection for receiving Internet protocol messages,
   a memory storing a configuration file,
   a microprocessor having a plurality of functional program modules operating with parameters contained in the configuration file, each of the functional modules locally storing configuration file parameters which affect its operations and having a check function and an update function, and
   a configuration update module adapted to receive a new configuration file over the wide area network connection while the microprocessor is in a running state, to store the new configuration file in memory, and to call the check function and the update function in each of the functional modules,
   wherein the check function for each of the functional modules determines whether any parameters in the new configuration file which affect the functional module have been changed, for each parameter that has been changed the check function determines whether the parameter can be updated dynamically, and the check function for each of the functional modules reports to the configuration update module whether all of the parameters in the new configuration file which affect the functional module that have been changed can be updated dynamically,
   wherein the configuration update module calls the update function for each of the functional modules when the configuration update module is reported to by all of the functional modules that all of the parameters in the new configuration file which affect the functional module that have been changed can be updated dynamically,
   wherein each of the functional modules performs the update function without rebooting the customer premises telecommunications hub by reading parameters in the new configuration file which affect the functional module that have been changed from the new configuration file and writing the read parameters to the locally stored configuration file parameters which affect its operations.

7. A system for dynamically updating configuration file parameters in a customer premises telecommunications hub comprising:

a remotely located configuration file server accessible over a wide area network connection, the configuration file server for storing configuration files, means for receiving a new configuration file from said configuration file server over said area network connection while the customer premises telecommunications hub is in a running state, means, for each of a plurality of functional modules of the customer premises telecommunications hub, for comparing parameters controlling operation of the functional module to parameters contained in the new configuration file and identifying parameters which are different, means, for each of the plurality of functional modules of the customer premises telecommunications hub, for identifying whether the parameters which are different can be changed dynamically, means, for each of the plurality of functional modules of the customer premises telecommunications hub, for reporting whether all of the parameters which are different can be changed dynamically, means for, when all of the plurality of functional modules of the customer premises telecommunications hub report that all of the parameters which are different can be changed dynamically, dynamically updating parameters controlling operation of each of the functional modules of the customer premises telecommunications hub to those contained in the new configuration file without rebooting the customer premises telecommunications hub, wherein the means for dynamically updating parameters of each of the functional modules of the customer premises telecommunications hub includes means for reading parameters in the new configuration file that control operation of the functional module and that have been changed, and further includes means for writing the read parameters to locally stored parameters which are used by the functional module.

8. The system of claim 7 further comprising:

means for, when any of the plurality of functional modules of the customer premises telecommunications hub report that any of the parameters which are different cannot be changed dynamically, causing the customer premises telecommunications hub to reboot.

9. The system of claim 7 further comprising:

means for dynamically updating parameters to those contained in the new configuration file only when the customer premises telecommunications hub is in idle state.

10. The method according to claim 1, wherein said update module issues a command to reboot said customer premises telecommunications hub when any of the functional modules notify the update module that not all of the parameters which are different can be updated dynamically.

11. The method according to claim 10, wherein said customer premises telecommunications hub is delayed from rebooting until the customer premises telecommunications hub is idle.

12. The customer premises telecommunications hub of claim 6, wherein the configuration update module sequentially calls the check function in each of the functional modules and sequentially receives the reports from the check function in each of the functional modules.

13. The customer premises telecommunications hub of claim 6, wherein the configuration update module issues a command to reboot the customer premises telecommunications hub when the configuration update module receives a report from the check function in any of the functional modules that indicates not all of the parameters that have been changed can be updated dynamically.

14. The customer premises telecommunications hub of claim 13, wherein the customer premises telecommunications hub is delayed from rebooting until the customer premises telecommunications hub is idle.

* * * * *